United States Patent [19]

Frye

[11] Patent Number: 4,459,888

[45] Date of Patent: Jul. 17, 1984

[54] NON-CONTACTING SLITTER

[75] Inventor: Kenneth G. Frye, South Egremont, Mass.

[73] Assignee: Beloit Corporation, Beloit, Wis.

[21] Appl. No.: 341,563

[22] Filed: Jan. 21, 1982

Related U.S. Application Data

[63] Continuation-in-part of Ser. No. 099,572, Dec. 3, 1979, abandoned.

[51] Int. Cl.[3] .......... B23D 19/04; B26D 1/24

[52] U.S. Cl. .......... 83/507; 83/51; 83/503; 83/675; 225/103

[58] Field of Search .......... 83/863, 864, 19, 51, 83/495, 344, 507, 500, 501, 502, 503, 675; 225/1, 3, 93, 98, 99, 103; 493/354

[56] References Cited

U.S. PATENT DOCUMENTS

| | | | |
|---|---|---|---|
| 797,886 | 8/1905 | Deely | 83/346 |
| 1,727,796 | 9/1929 | Sumner | 83/500 |
| 1,798,475 | 3/1931 | Lange | 93/58.7 R |
| 1,909,016 | 5/1933 | Schulz | 83/346 |
| 1,998,929 | 4/1935 | Johnstone | 164/60 |
| 2,048,684 | 7/1936 | Carr | 164/60 |
| 2,429,944 | 10/1947 | Rayburn et al. | 225/4 |
| 2,683,489 | 7/1954 | Jackman | 83/485 |
| 2,733,766 | 2/1956 | Wikle | 83/271 |
| 3,142,233 | 7/1964 | Downie | 93/58.7 R |
| 3,181,758 | 5/1965 | König | 83/51 |
| 3,312,135 | 4/1967 | Mraz | 83/675 |
| 3,383,991 | 5/1968 | Sarka | 93/58.2 R |
| 3,386,323 | 6/1968 | Dovey | 83/470 |
| 3,578,761 | 5/1971 | Sarka | 93/58.2 R |
| 3,612,367 | 10/1971 | Benz | 83/675 |
| 3,628,409 | 12/1971 | Imbert | 83/175 |
| 3,641,853 | 2/1972 | Jungbeck | 83/51 |
| 3,803,963 | 4/1974 | Hunt | 83/116 |
| 3,850,059 | 11/1974 | Kang | 83/7 |
| 3,863,537 | 2/1975 | Huelsman | 83/503 |
| 3,939,745 | 2/1976 | Weeks et al. | 83/425.3 |
| 4,279,369 | 7/1981 | Passafiume | 225/3 |
| 4,355,794 | 10/1982 | Costigan | 270/31 |

FOREIGN PATENT DOCUMENTS

| | | | |
|---|---|---|---|
| 2159427 | 6/1973 | Fed. Rep. of Germany | 83/51 |
| 1464921 | 11/1966 | France | 81/51 |
| 5516 | of 1900 | United Kingdom | 83/495 |

OTHER PUBLICATIONS

J. David Pfeiffer, Tappi, Apr. 1981, vol. 64, No. 4, pp. 105–106.

*Primary Examiner*—Frank T. Yost
*Assistant Examiner*—Hien H. Phan
*Attorney, Agent, or Firm*—Hill, Van Santen, Steadman & Simpson

[57] ABSTRACT

Web severance is effected between non-contacting radially opposed severance points of circular edges on rotary upper and lower members between which continuously running paper web to be slit is engaged, the space between the severance points being sufficiently less than the thickness of the paper web and so related to the physical properties of the web as to cause severance of the web as a result of web fiber failure separation fracture at the point of maximum compression.

5 Claims, 5 Drawing Figures

Fig. 1
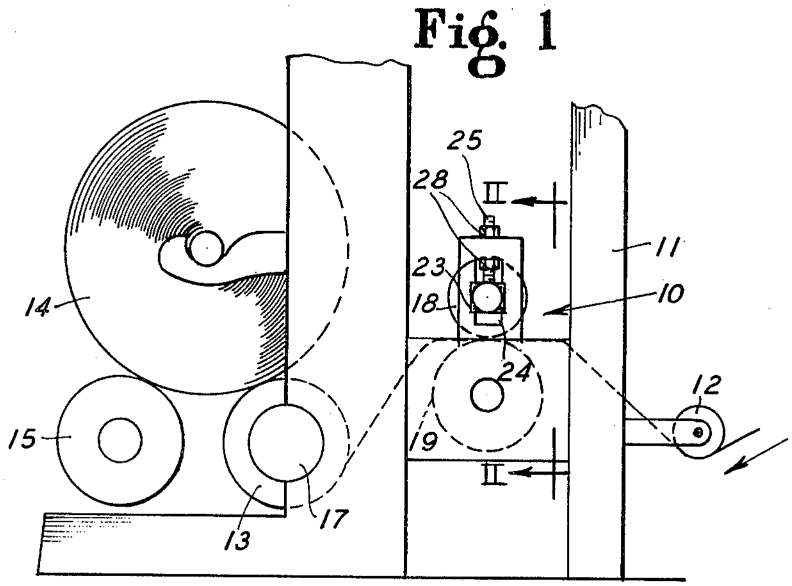
Fig. 3
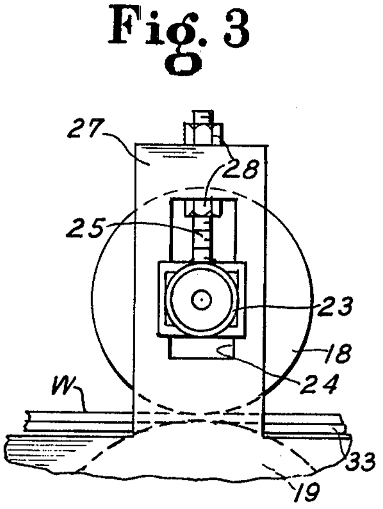
Fig. 2
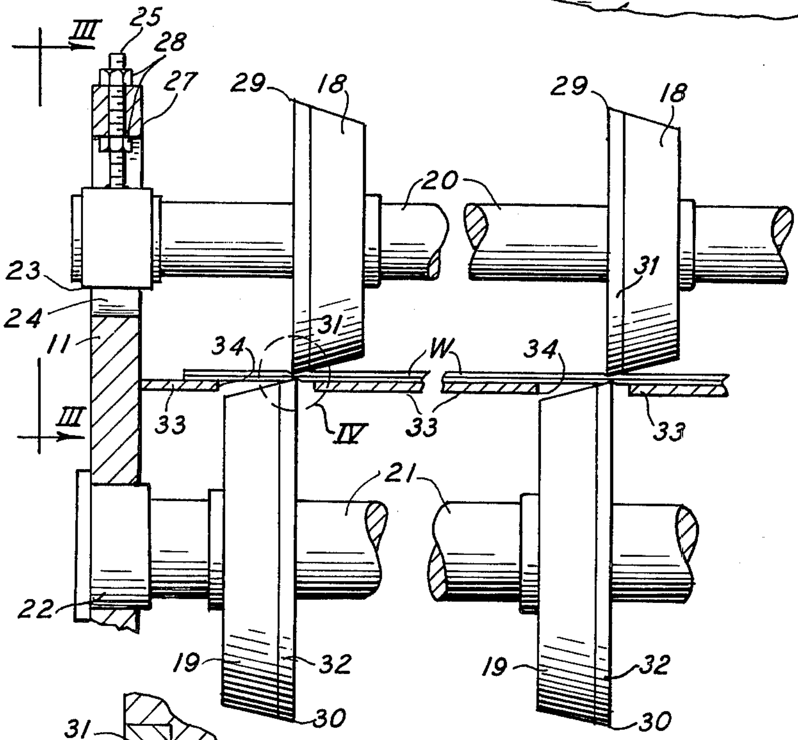
Fig. 4
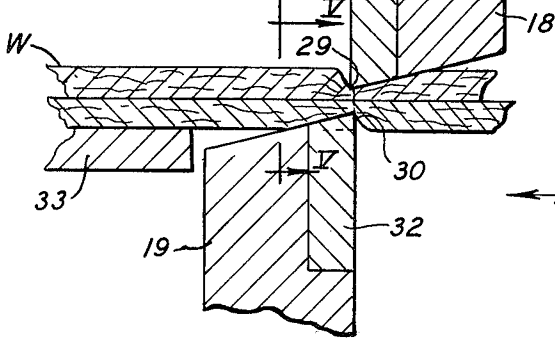
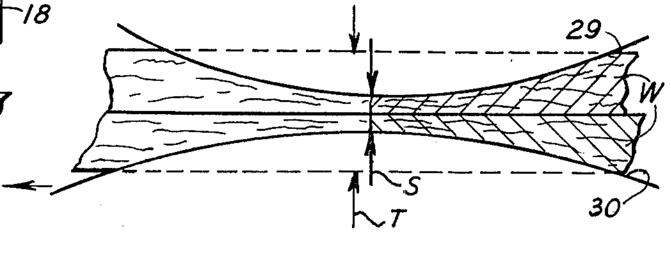
Fig. 5

NON-CONTACTING SLITTER

RELATED APPLICATION

This application is a continuation-in-part of my pending application Ser. No. 99,572, filed Dec. 3, 1979 now abandoned.

BACKGROUND OF THE INVENTION

This invention relates to the art of slitting paper webs, and is more particularly concerned with new and improved means and method which avoids certain problems inherent in prior slitting techniques.

Heretofore, shearing of paper web has generally been by means of a sharp beveled top rotating blade running in contact with a relatively less sharp bottom band. The angles of the top blade and bottom band may vary, but the top blade usually runs from 30 to 90 degrees included angle. The bottom band has an approximately 3° to 10° bevel on the cutting surface. Further, in order to effectively shear material, it is necessary to toe-in and overlap the top blade with the bottom band to ensure blade contact at only one point, which is called the cut point, and is the only point of contact between the two components.

As thus described, the prior expedients have been plagued with certain problems which manifest themselves not only in the excessive dust generated, but also in a plow effect of the bevel and toe-in of the top blade. Such bevel on the top blade is necessary to reduce the cutting force necessary to shear the paper. Also, a sharp point has a higher concentration of load than a flat surface. The bevel, however, creates a tension in the plane of the paper to help sever the fiber. Nevertheless, the almost inevitable plow effect causes tearing rather than incising of the web and thus contributes to the dust problem, in addition to the dust generated due to slitter blade contact and wear.

Another problem due to slitter wear is that as the blade wears, it is necessary to resharpen the same, thus reducing its diameter. This requires frequent readjustments in an attempt to maintain proper cut point.

SUMMARY OF THE INVENTION

A principal aim of the present invention is to overcome the foregoing and other disadvantages, drawbacks, inefficiencies, shortcomings and problems inherent in prior practice, and to effect substantial improvements in slitting of paper webs.

To this end, it is an important object of the present invention to provide new and improved means for slitting paper webs, in which the slitter components do not make contact with one another.

Another object of the invention is to substantially eliminate the plow effect during paper web slitting.

Another object of the invention is to substantially eliminate the dust problem during paper web slitting.

A further object of the invention is to provide a new and improved paper web slitter in which wear of the slitter components is greatly minimized, and adjustability of components is substantially simplified and facilitated.

There is provided in a springy compressible paper web slitter having a pair of cooperating circular rotary members, said members having cooperating peripheral web severing continuously circular edges having severance points at their closest approach to one another in spaced non-contacting radial opposition for engaging therebetween a running paper web to be slit, peripheral surfaces on said members sloping on respective shallow angles away from said edges and said edges overlapping not in excess of 0.010 inch; and means mounting said members for maintaining a spacing between said severance points no greater than 30% of the thickness of the running paper web and so related to the plane and the physical properties of said web as to cause compression pinching of the web to as nearly as practicable equal indentation from each face of the web by and between said severance points, so that fiber failure by separation fracture is caused, starting substantially at the center of the thickness of the web in line with the severance points, due to the intense internal stresses imposed on the web by the severance points progressively along a predetermined severance line in the continuous severance of said running web.

The invention also provides a method of slitting a continuously running compressible paper web, comprising, running said web in engagement between cooperating, non-contacting radially opposed severance points provided by continuously circular peripheral web severing edges on a pair of cooperating rotary members having peripheral surfaces sloping on respective shallow angles away from said edges, adjusting axial overlap of said severing edges to be not in excess of 0.010 inch at said severance points, maintaining a spacing no greater than 30% of the thickness of said web between said severance points; and pressing said severance points to as nearly as practicable equal, opposite extent into the opposite faces of said web and thereby indenting and effecting pinching compression of the web, and imposing intense internal stresses in the paper fibers and causing fiber separating fracture failure of the web fibers by and between said severance points along a predetermined longitudinal severance line in the running web.

BRIEF DESCRIPTION OF THE DRAWING

Other objects, features and advantages of the invention will be readily apparent from the following description of a certain representative embodiment thereof, taken in conjunction with the accompanying drawing although variations and modifications may be effected without departing from the spirit and scope of the novel concepts embodied in the disclosure, and in which:

FIG. 1 is a schematic side elevational view of a slitter and winder embodying features of the invention;

FIG. 2 is an enlarged fragmental vertical sectional elevational detail view taken substantially along the line II—II of FIG. 1;

FIG. 3 is a fragmentary elevational view taken substantially in the plane of line III—III of FIG. 2;

FIG. 4 is an enlarged illustrative sectional view taken substantially in the area IV of FIG. 2; and FIG. 5 is a fragmentary schematic illustrative view taken substantially along the line V—V of FIG. 4.

DETAILED DESCRIPTION OF THE PREFERRED EMBODIMENTS

By way of example, a slitter 10 (FIG. 1) embodying the invention is adapted to be supported by a suitable frame 11 to receive paper web W fed therethrough from any suitable source such as a paper making machine, calender, or a source roll (not shown). From the source, the paper web W is adapted to pass about a guide roller 12 to and through the slitter 10, and the slit web leaving the slitter and passing to a sheeter or any other desired process, or may be guided about a drum 13 and wound into rolls 14 which may in addition to support from the drum 13, receive support from a cooperating drum 15. The drum 13 may be powered in any desirable manner, represented schematically by the drive means 17. The slitter 10 may be equipped to slit the paper web W into as many strips to be wound onto individual rolls 14 as desired, having regard to the kind of paper web being processed.

A characteristic of all paper webs is that they comprise fiber matrix as the principal material although various treating materials, fillers and the like may be carried by or incorporated in the web. The paper web to be slit may be either a single layer paper web or a plurality of individually formed paper webs which may pass through the slitter 10 in laminar relation, as depicted by way of illustration in the drawings, such as facial or toilet tissue or fine paper for a sheeter, and which is often employed in double thickness.

Pursuant to the present invention, springy compressible paper webs are especially efficiently severed along predetermined slit lines in continuously running web cleanly and with negligible dust problem compared to prior expedients. By the term "springy compressible paper web" is meant any kind of web having a $K_2$ or basic springyness factor (see Tappi/April 1981, Vol. 64, No. 4, pp. 105–106) ranging between 6 and 100 is intended and which is susceptible to being severed by the slitter 10. Hard, dense material characterized by a $K_2$ factor over 100 can generally be readily sheared without tearing. The lower $K_2$ ranges of paper web cannot be sheared in conventional manner without substantial tearing and consequent dust generation. The present invention, utilizing the new and improved slitter 10, attains efficient severance of the lower $K_2$ ranges of paper webs without tearing.

In the slitter 10, the paper web W is severed between one or more pairs of cooperating circular rotary components or members, comprising for each slit to be made, a top member 18 and a bottom member 19. As is generally the case, a plurality of pairs of the slitter members 18 and 19 is employed across the width of the web W, one pair being adjacent to one longitudinal side edge of the web, and another pair being adjacent to the opposite side edge of the web and serving to trim off the side edge portions of the web which may be discarded. One or more pairs of the slitter members may be located at additional desired intervals across the web determinative of the width of the strips into which the web is to be slit. Although each of the rotary slitter members 18 and 19 may be separately rotatably mounted, all of the upper members 18 may be mounted corotatively on a common shaft 20 and all of the lower members 19 may be corotatively mounted on a common shaft 21. Preferably, both of the shafts 20 and 21 are driven but for some applications only the lower shaft 21 may be driven at the speed predetermined for the running speed of the web W. Where both the top and bottom members 18 and 19 are driven, a desirable slicing effect results. No particular driving means are shown for the shafts 20 and 21 because such driving means are well known. Supported journaling of the shaft 21 on the frame 11 is by means of suitable bearings 22 at opposite ends of the shaft.

Mounting of the upper shaft 20 may be by means which will permit vertical adjustment of the upper slitter members 18 relative to the companion lower slitter members 19. Such means may comprise respective bearing blocks 23 carrying the opposite ends of the shaft 20 and vertically adjustable in respective vertical ways 24 by means such as respective adjustment screws 25 carried by a supporting frame head 27 and adapted to be locked in adjustment by means of locking nuts 28. On the other hand, the upper slitter members 18 may be mounted to be individually adjustable relative to their companion slitter members 19. In any event, the members 18 and 19 and their shafts 20 and 21 should be supported in a rigid and sturdy manner, as for example according to the disclosure in the copending application of Gerald A. Guild, Ser. No. 228,261, filed Jan. 26, 1981, now U.S. Pat. No. 4,380,945 issued Apr. 26, 1983, and assigned to the same assignee as the present application, to as nearly as practicable avoid deflection of the slitter components, and in particular at the edges 29 and 30.

According to the present invention, each of the upper slitting members 18 has a peripheral web severing edge 29 and each of the lower slitting members 19 has a peripheral web severing edge 30 and the edges 29 and 30 are in non-contacting radial opposition to one another for engaging therebetween the running paper web W to be slit. The space between the points of closest approach of the edges 29 and 30 must be sufficiently less than the thickness of the running paper web W and so related to the physical properties of the web as to cause pinching compression severance of the web.

For maximum resistance to wear, such as may be caused by abrasiveness in the paper web, the edges 29 and 30 may be provided on highly wear resistant material such as carbide rings 31 and 32, respectively, carried by the bodies of the members 18 and 19 constructed from a less expensive material.

For optimum results, the perimeters of the members 18 and 19 should have only a very shallow angle sloping away from the respective slitting edges 29 and 30 to preferably no greater than 20°. Some angularity other than square is desirable, but the smaller the angle the better. Overlap of the non-contacting edges 29 and 30 in axial direction where, as best seen in FIGS. 2 and 4, the edges 29 and 30 are at the adjacent axial faces of the members 18 and 19, should be as little as practicable such as from directly diametrically aligned to not over 0.010 inch. Desirably, the radial spacing between the edges 29 and 30 should be not greater than 30% of the thickness of the web. Proper radial spacing and then maintenance of the edges 29 and 30 in the optimum pinching compression, fiber failure by separation fracturing severance engagement with the web is adapted to be accomplished by means of the adjustment screws 25 or individual adjustment of the members 18 and 19.

Supporting table means 33 supports the web W in stable condition in the slitter 10, and for this purpose the upper supporting surface of the table means is in a proper plane with respect to the edges 29 and 30 at both sides of the respective pairs of slitter members 18 and 19. Suitable clearance openings 34 in the table 33 provide clearance for the lower members 19.

As best visualized in FIGS. 4 and 5, as the web runs through the rotating cooperating circular rotary slitter members 18 and 19, the non-contacting slitting edges 29 and 30, at the closest approach or severance point of rotating edges, severely pinch and compress the engaged web by concentration of maximum pinching compression stress at the cooperating severance points.

This compacts the fibers from the web thickness by indentation of the web, as indicated between the arrows T (FIG. 5), to the as nearly as practicable equal opposite extent indicated between the arrows S (shown as about 30%) at the point of nearest approach of the edges 29 and 30 so that fiber failure by separating fracture is caused starting substantially at the center of the thickness of the web due to the intense internal stresses imposed on the web by the severance points of the slitting edges 29 and 30 and thus severance of the continually advancing web along the slit line. Since the members 18 and 19 are circular and their circumferences taper away from the continuously circular edges 29 and 30, respectively, the web is substantially free from deflection from its plane except closely at either side of the severance points, any tendency toward permanent grooving is minimized, and there is minimum tension in the plane of the web, so that tearing is precluded, and a clean, precise, non-ragged slit edge results. The web edges alongside the slits are free to spring back toward the normal faceplanes of the web. There is virtual elimination of any plowing effect. Dust is substantially eliminated or at least greatly minimized.

The top and bottom slitter members 18 and 19 can be preadjusted transversely relative to the web to attain the desired strip widths of the slit web. Adjustment of the radial spacing at the severance points between the slitting edges 29 and 30 relative to the particular web to be slit, can be readily effected through the adjusting screws 25 by adjusting all of the upper members 18 uniformly relative to the lower members 19. By means of the proper spacing between the severance points, vertical loading of the slitter members 18 and 19 relative to one another may be on the order of from 200 to 800 pli at the severance point engagement of the web, having regard to the physical character and thickness of the particular web being slit.

Among numerous advantages inherent in the web slitter and method of slitting according to the present invention may be mentioned that no side loading of slitter blades is necessary; no penetration adjustment of slitter blades in necessary; there is no wear caused by knife-to-knife contact; the web or web strips may be wrapped around the upper or bottom slitter members, if desired; cross machine adjustment of the top and bottom slitter members may be effected while the web is in the slitter; there is maximum slitter member life; the upper and lower slitter members need not be adjusted for wear take-up in axial direction but adjustment may be necessary and is easily effected from time-to-time in the radial direction to accommodate variables in any given run of web to be slit.

It will be understood that variations and modifications may be effected without departing from the spirit and scope of the novel concepts of this invention.

I claim as my invention:

1. In a slitter for slitting springy compressible paper web having a $K_2$ factor under 100, and having a pair of cooperating circular rotary members:

said members having cooperating peripheral web severing continuously circular edges having severance points at their closest approach to one another is spaced non-contacting radial opposition for engaging therebetween a running paper web to be slit;

peripheral surfaces on said members sloping on respective shallow angles away from said edges and said edges overlapping not in excess of 0.010 inch;

and means mounting said members for maintaining a spacing between said severance points no greater than 30% of the thickness of the running paper web and so related to the plane and the physical properties of said web as to cause radial thrusting compression pinching of the web to as nearly as practicable equal extent indentation from each face of the web by and between said severance points, so that fiber failure by separation fracture is caused, starting substantially at the center of the thickness of the web in substantially radial alignment with said severance points, due to the intense internal stresses imposed on the web by the severance points progressively along a predetermined severance line in the continuous severance of said running web.

2. A paper web slitter according to claim 1, wherein said web severing edges are located at the convergence of said peripheral surfaces and respective axially facing surfaces of said members.

3. A paper web slitter according to claim 1, wherein said peripheral surfaces extend from said edges at sloping angle no greater than 20°.

4. A paper web slitter according to claim 1, including means for supporting the web in a plane aligned with said severance points of said edges whereby to assist in minimizing tension in the plane of the web.

5. A paper slitter according to claim 1, said means mounting said member for maintaining a spacing being adapted to effect loading of said members relative to one another for applying a pressure of from 200 to 800 pli at said severance points in engagement with the web.

* * * * *